F. E. DILDINE.
FISHING APPARATUS.
APPLICATION FILED JAN. 30, 1915.
1,190,872.
Patented July 11, 1916.
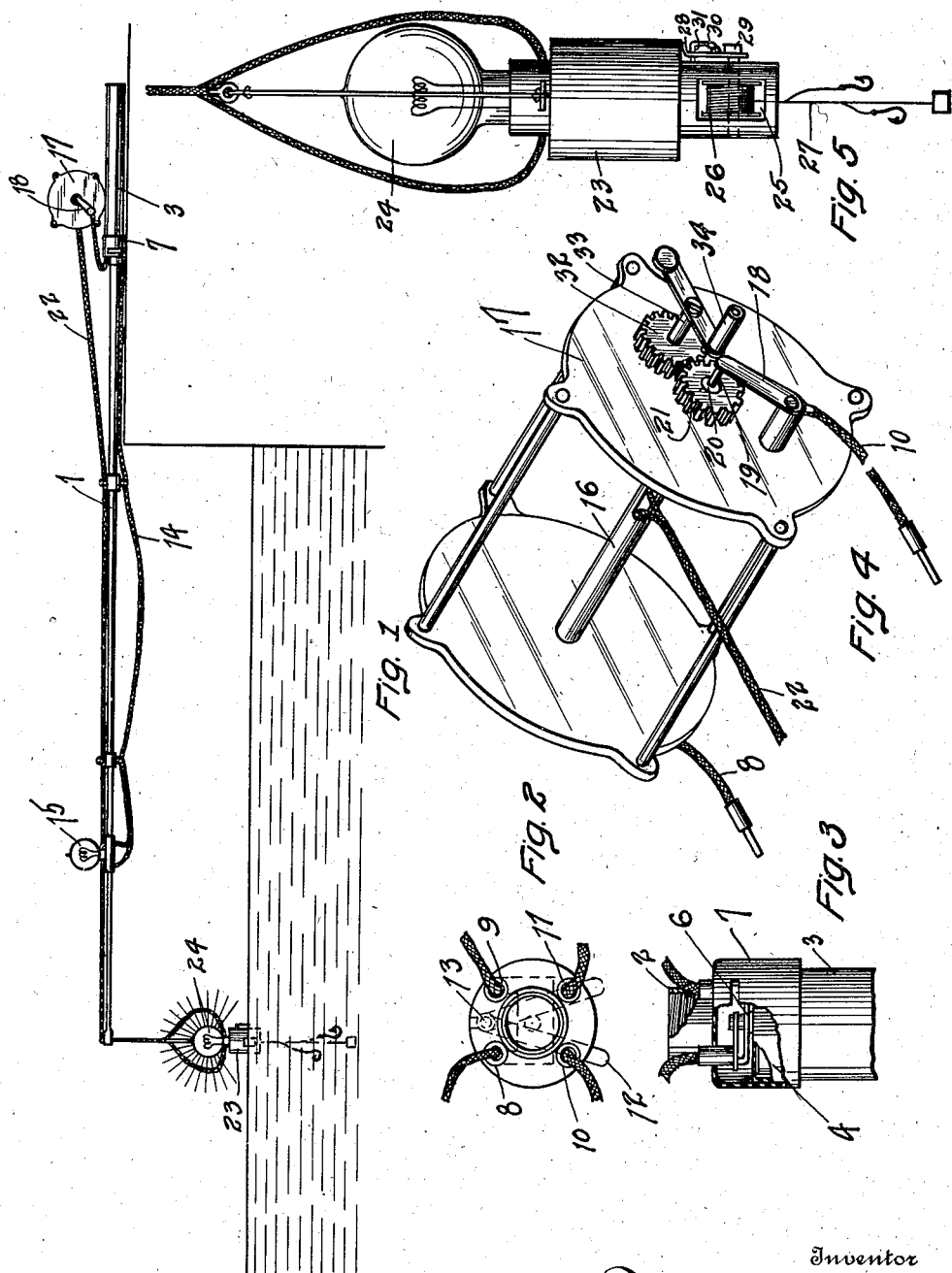

UNITED STATES PATENT OFFICE.

FOREST E. DILDINE, OF COLUMBUS, OHIO.

FISHING APPARATUS.

1,190,872.     Specification of Letters Patent.     Patented July 11, 1916.

Application filed January 30, 1915. Serial No. 5,173.

*To all whom it may concern:*

Be it known that I, FOREST E. DILDINE, a citizen of the United States, residing at Columbus, in the county of Franklin and State of Ohio, have invented certain new and useful Improvements in Fishing Apparatus, of which the following is a specification.

My invention relates to fishing apparatus and has particular bearing to means for providing an illuminating device to be used in connection with the float.

It is often desirable that the surface of the water about the float be illuminated by at least such a degree that the float itself will be clearly discernible. In carrying forth this idea, I have provided a fishing pole with a suitable battery and have run a line connection from the top of the float to this battery, it being understood that the float is itself provided with an electric light bulb and that the line is formed of a double strand of electric wire.

A further object of my invention resides in so arranging my connections and wires that a reel may be used whereby the electric wires leading to the float may be readily reeled in or out as may be desired.

A further object of my invention resides in so constructing the float itself that a twine connection carrying the usual hooks, etc., may be attached to its underside, this attachment being such that the length of the twine may be adjusted as desired.

The preferred embodiment of my invention is shown in the accompanying sheet of drawings, in which similar characters of reference designate corresponding parts, and in which:

Figure 1 is a side view of a fishing pole embodying my invention. Fig. 2 is an end view of the handle portion shown removed, Fig. 3 is a partial side elevation and partial section of the structure shown in Fig. 2, Fig. 4 is a detail view in perspective of the preferred type of reel used by me, and, Fig. 5 is an enlarged view in elevation of the float member used by me.

In these drawings, the numeral 1 designates the body of the pole proper, the rear portion of this pole being designed to have threaded connection with an internally threaded collar portion 2 on the upper end of the handle member 3. This handle member is preferably of hollow construction to incase a battery 4, the central contact portion 5 of which is designed to electrically connect with a complemental contact member 6 rigidly carried by the cap portion 7 for the upper end of the casing 3. This cap portion 7 is also provided with four binding posts, as shown at 8, 9, 10 and 11, those designated 8 and 9 being at all times electrically connected with the contact member 6, while those designated 10 and 11 are designed to coöperate with a switch member 12, this latter being pivoted as shown at 13 and being in electrical communication with the conducting casing 3, it being understood that the cap portion 7 is formed of insulating material. The wires leading from the binding posts 9 and 11 are desirably merged into one cord as shown at 14, this latter leading to an electric light bulb 15 shown located adjacent the outer end of the pole 1. This cord 14 leads directly from the battery within the handle portion 3 to the bulb 15 and is controlled in its illumination by means of the switch 12, while the other cords leading from the binding posts 8 and 10 are desirably caused to enter the hollow spindle portion 16 of the reel shown generally at 17. The wire from post 8 enters this spindle somewhat like the wire from post 10 which is attached to a pivoted leaf member shown at 18, the outer end of this leaf member being designed to bear upon the contact point 19 carried by a piece of insulation 20 and passing centrally through the pinion 21 and entering the spindle 16 to connect with the complemental conducting wire therein. From the interior of the spindle 16 these wires merge into a common cord shown at 22 where they pass to the outer end of the pole to be connected to the upper end of the float member 23 shown in detail in Fig. 5. The upper portion of this float member is provided with an electric light bulb 24 to which the wires forming the cord 14 are properly attached and the illuminated condition of this bulb may be controlled by the switch 12. The lower portion of the float 23 is cut out as shown at 25 to rotatably receive a spool 26 upon which an ordinary piece of fishing twine 27 is wound, this twine being adjustable as to length by means of the crank shown at 28 rigidly carried by the spool axle 29. The spool 26 is held in any adjusted position by means of the locking member 30 shown pivoted to the crank 28 and also shown as having an inwardly turned arm 31 designed to enter a socket within the body of the float 23, as shown, whereby rotation of the axle 29 is prevented. A pinion 32 is provided and so mounted upon a stub shaft 33 carried by the reel 17 that it meshes with the gear 26, this stub shaft 23 being also provided with a hand crank 34 of a well known construction. It will, therefore, be apparent that rotation of the hand crank 34 will cause rotation of the spindle 16 to thereby shorten the effective length of the cord 22, which latter serves as a medium of attachment between the pole proper and the upper portion of the float 23.

It will thus be apparent that I have provided a type of construction whereby the water surface surrounding the float may be suitably illuminated to accommodate fishing after dark. It will also be apparent that the length of the twine portion 27 may be adjusted to suit conditions.

What I claim is:—

1. A fishing apparatus comprising a pole, a battery carried by said pole, a float, an electric light bulb on said float, an electric light bulb on said pole, electric wires connecting both of said bulbs to said battery, a twine connected to the underside of said float, and a switch mechanism for lighting said bulbs, said mechanism being arranged so that one of said bulbs will be extinguished when the other is lighted.

2. A fishing apparatus comprising a pole, a battery carried by said pole, a float, an electric light bulb on said float, a reel, a hollow spindle forming a portion of said reel, wires leading from said bulb through said hollow spindle, binding posts carried by said reel, wire connections between said posts and said battery, and a contact structure located between said reel and said spindle and arranged to permit rotation of said spindle.

In testimony whereof I affix my signature in presence of two witnesses.

FOREST E. DILDINE.

Witnesses:
   WALTER E. L. BOCK,
   A. L. PHELPS.